Figure 1:
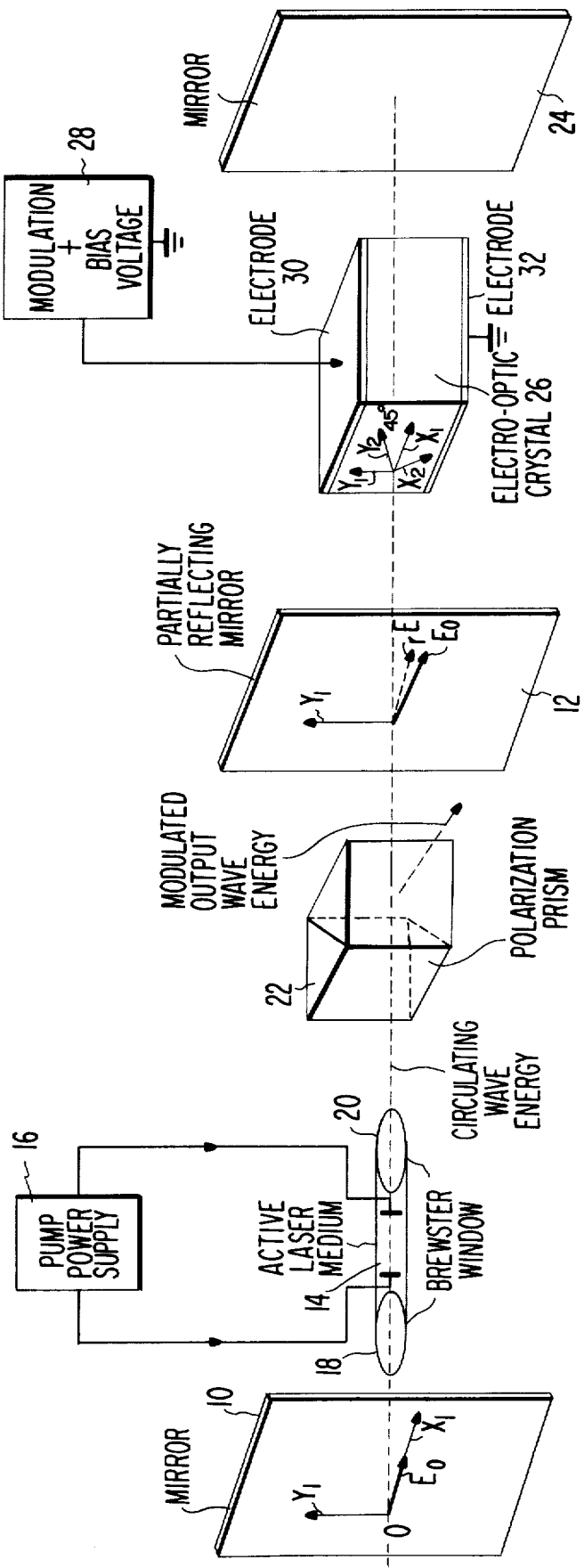

United States Patent [19]

Waksberg

[11] 3,918,007
[45] Nov. 4, 1975

[54] FABRY-PEROT POLARIZATION LASER BEAM MODULATOR

[75] Inventor: Armand Lucien Waksberg, Dollard-Des-Ormeaux, Quebec, Canada

[73] Assignee: RCA Corporation, New York, N.Y.

[22] Filed: Mar. 25, 1974

[21] Appl. No.: 454,157

[52] U.S. Cl. ........................................... 331/94.5 M
[51] Int. Cl.² .......................................... H01S 3/10
[58] Field of Search ............ 331/94.5; 350/150, 160

[56] References Cited
UNITED STATES PATENTS

| | | | |
|---|---|---|---|
| 3,418,476 | 12/1968 | Muller et al. | 331/94.5 M |
| 3,576,502 | 4/1971 | Johnston, Jr. et al. | 331/94.5 C |

*Primary Examiner*—William L. Sikes
*Attorney, Agent, or Firm*—Edward J. Norton; George J. Seligsohn

[57] ABSTRACT

A polarization rotating electro-optic crystal, responsive to an applied modulating signal, is situated in a Fabry-Perot cavity which is external to but aligned with a main laser optical resonant cavity. The two cavities include in common a partially reflective-partially transmissive mirror which separates the two cavities, but permits coupling of incident wave energy from the laser cavity to the Fabry-Perot cavity and the feed back of wave energy having a polarization-modulation component from the Fabry-Perot cavity to the laser cavity. Polarizer means in the laser cavity ejects this polarization component from the laser cavity as an output. The modulator exhibits a high modulating efficiency with respect to modulating drive power.

11 Claims, 2 Drawing Figures

FABRY-PEROT POLARIZATION MODULATOR $X_1, Y_1$ = CIRCULATING WAVE ENERGY POLARIZATION AXES
$X_2, Y_2$ = ELECTRO-OPTIC CRYSTAL AXES

FABRY-PEROT POLARIZATION LASER BEAM MODULATOR

This invention relates to laser beam modulators, and more particularly, to a Fabry-Perot polarization laser beam modulator.

Two types of known laser beam modulators are an external laser beam modulator and an internal laser beam modulator. In an external laser beam modulator, such as disclosed in U.S. Pat. No. 3,327,121, the output beam from a laser is applied through a control member, which may comprise an electro-optic crystal placed within an electric field controlled by the modulating signal. In the case of an external laser beam modulator, the operation of the laser itself is completely independent of the operation of the modulator. However, an external laser beam modulator has the disadvantage that the required drive power for the modulator is relatively high. In an internal laser beam modulator, such as disclosed in U.S. Pat. No. 3,418,476, the control member, which also may comprise an electro-optic crystal, is situated within the resonant optical cavity of the laser itself. Although the drive power required for an internal laser beam modulator is significantly lower than that required for an external laser beam modulator, the operation of the laser and modulator are so intimately associated that the failure of the modulator results in the extinction of operation of the laser. Further, the optical losses due to the presence of the crystal within the cavity lowers its optical efficiency. This interdependence between the operation of the laser and the modulator in an internal laser beam modulator makes it more difficult to align and, in case of failure, the electro-optic crystal is more difficult to service. All of this makes the use of an external laser beam modulator superior to an internal laser beam modulator for many purposes, despite the higher drive power requirements of an external laser beam modulator.

One type of internal laser beam modulator, exemplified by FIG. 1 of the aforesaid U.S. Pat. No. 3,418,476, involves the use of an additional partially reflecting surface within the optical resonant cavity to narrow the resonant bandwidth thereof, with the active laser medium being situated between one reflection surface of the optical resonant cavity and the additional reflecting surface and the modulating control member being situated between the other reflecting surface of the optical resonant cavity and the additional reflecting surface. In this type of internal laser beam modulator, modulation is achieved by varying the gain of the optical resonant cavity in accordance with changes in the effective optical length in wavelenghts of the control member determined by the modulating signal applied thereto. In another type of internal laser beam modulator, exemplified by FIG. 2 of the aforesaid U.S. Pat. No. 3,418,476, modulation is achieved by inserting a polarization device within the optical resonant cavity which retains within the cavity in-phase-polarized wave energy and ejects as the modulated output of the internal laser beam modulator the quadrature-polarized wave energy. Polarization-modulation is achieved by effectively rotating the polarization of the circulating wave energy by an amount determined by the size of the modulating signal applied to the control member within the optical resonant cavity. In actual fact, the apparent rotation of the field is a transformation from a linearly to an elliptically polarized wave. This latter type of internal laser beam modulator is known as an internal polarization laser beam modulator. As is known, an internal polarization laser beam modulator requires relatively little drive power to achieve a high degree of modulation.

The present invention is directed to a new form of polarization laser beam modulator, which is similar to an external laser beam modulator to the extent that the operation of the laser is independent of the operation of the modulator, and is similar to an internal laser beam modulator to the extent that it operates efficiently with respect to the required drive power. In fact, its efficiency capability is even greater than the internal polarization laser beam modulator. The present invention is particularly suitable for use with $CO_2$-type lasers.

Recent modulation techniques have opened the door to very wide bandwidth modulation of $CO_2$-type lasers. These bandwidths can be far in excess of the actual gain bandwith of the laser. In particular, in the case of the $CO_2$ laser, the gain bandwidth is of the order of 60 MHz at normal operating conditions. The modulation bandwidth that can be obtained using the technique of internal polarization modulation, discussed above, can reach in principle, the GHz range. Such high bandwidths are in demand because they permit much more information to be communicated over a laser beam in a given time than can be achieved with lower bandwidths. However, as discussed above, internal polarization modulation suffers several disadvantages resulting from the fact that the modulating crystal has to be placed inside the laser cavity.

The new polarization modulation system to which the present invention is directed shares in the wide bandwidth capabilities of the internal polarization modulation system. However, the polarization modulation system of the present invention (1) requires substantially lower drive power, (2) permits the modulating control element to be placed externally of the laser cavity and (3) is inherently much simpler to align than is an internal polarization modulation system.

Briefly, apparatus incorporating the present invention includes a laser comprising an active laser medium situated within an optical resonant cavity for generating coherent wave energy in response to the pumping of the active lasing medium. This optical resonant cavity is defined by first and second spaced mirrors, at least the second mirror being partially reflecting and partially transmissive. Further included within the optical resonant cavity is polarizer means for retaining within the optical resonant cavity that component of coherent wave energy incident thereon which has a given polarization and for rejecting as an output from the optical resonant cavity that component of the coherent wave energy incident thereon which has a polarization in quadrature with the given polarization. The apparatus further includes a third mirror situated outside of the optical resonant cavity in spaced relationship with the second mirror to define therebetween a Fabry-Perot cavity at the wavelength of the coherent wave energy, with the optical resonant cavity and the Fabry-Perot cavity being optically aligned to permit the coherent wave energy partially transmitted by the second mirror to move in either direction between the cavities. Situated within the Fabry-Perot cavity is polarization-rotating means for effectively rotating the polarization of the coherent wave energy incident thereon in accordance with a modulating signal applied to the polarization-rotating means.

In applicant's invention, most of any wave energy which passes from the optical-resonant cavity to the Fabry-Perot cavity through the second partially transmissive mirror is ultimately fed back to the optical-resonant cavity through the second partially transmissive mirror. However, while in the Fabry-Perot cavity, it is reflected back and forth between the second and third mirrors through the polarization-rotating means. This significantly increases the modulation sensitivity of the polarization-rotating means so that a relatively small amount of modulating-signal drive power is required to produce a high degree of polarization modulation of the coherent wave energy.

Figure 2:
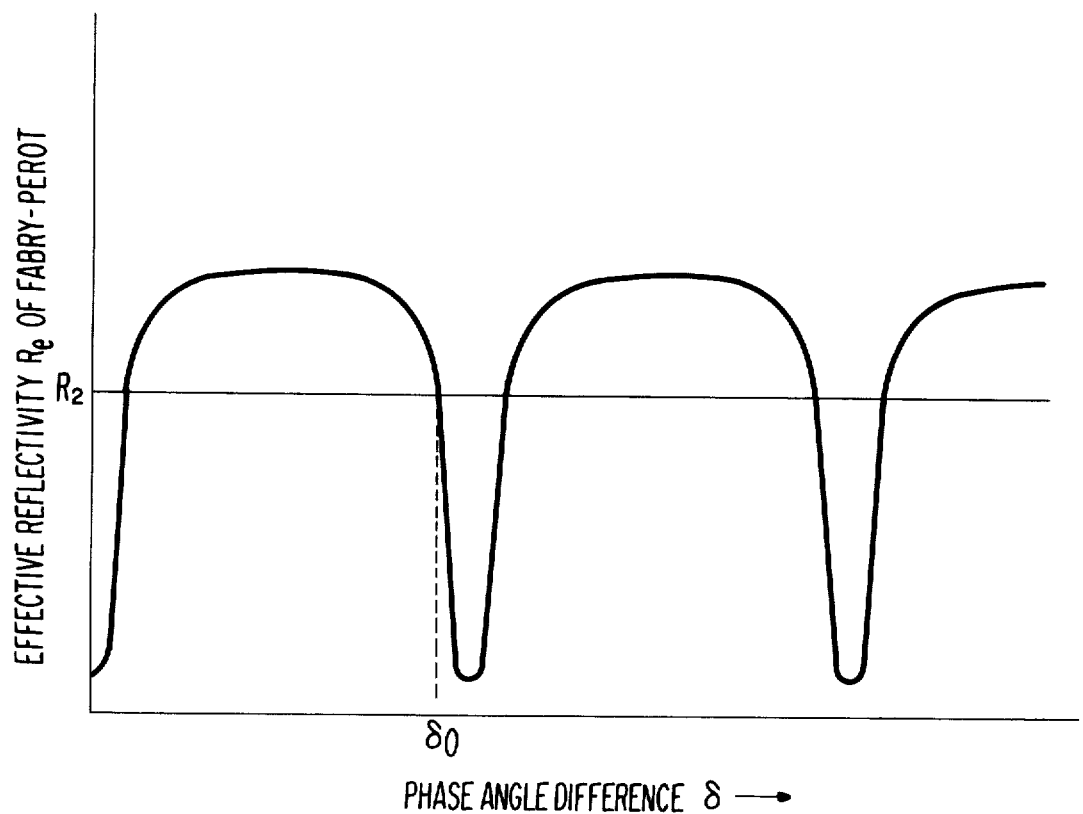

This and other features and advantages of the present invention will become more apparent from the following detailed description taken together with the accompanying drawing, in which:

FIG. 1 is a block diagram of a Fabry-Perot polarization modulator incorporating the present invention, and FIG. 2 shows a typical effective reflectivity curve as a function of phase shift.

In describing the present invention, it will be assumed, for illustrative purposes, that the laser is a $CO_2$ laser operating at a wavelength of about 10.6 micrometers. However, it is not intended that the present invention be limited to a $CO_2$ laser operating at a wavelength of about 10.6 micrometers. As will become plain from the following description, the applicability of the present invention is limited only by the relative losses at the operating wavelength exhibited by the mirrors and the material forming the polarization-rotating means and by the reflectivity of the mirrors with respect to the gain exhibited by the active laser medium.

Referring now to FIG. 1, there is shown an optical-resonant cavity for the laser composed of first mirror 10 and second mirror 12. Although first mirror 10 is normally substantially totally reflective, it, alternatively, may be partially reflective and partially transmissive. However, second mirror 12 is always partially reflective and partially transmissive.

Situated within the optical-resonant cavity defined by mirrors 10 and 12 is active laser medium 14, which, for illustrative purposes, is assumed to be a $CO_2$ gas discharge tube. Active laser medium 14, which is pumped in a conventional manner by pump power supply 16 coupled to spaced electrodes therein, is terminated at its opposite ends by Brewster windows 18 and 20, which are attached to the envelope thereof. Brewster windows 18 and 20 may be replaced by non-Brewster windows, if the latter are suitably coated with anti-reflective coatings.

Also situated within the optical-resonant cavity defined by mirrors 10 and 12, and preferably located between active laser medium 14 and mirror 12, is polarization prism 22. If active laser medium 14 includes one or more Brewster windows, the inclusion of polarization prism 22 as the polarizer means is desirable, but not essential, because a Brewster window inherently operates as a polarizer means. However, where active laser medium 14 is terminated in non-Brewster windows, the inclusion of a separate polarizer means, such as polarization prism 22, becomes essential. In any case, the angular orientation of polarization prism 22 and/or Brewster windows 18 and 20 is such as to retain within the optical-resonant cavity defined by mirrors 10 and 12 that component of wave energy which has a given polarization and to eject from this optical-resonant cavity any wave energy component therein which has the polarization in quadrature with the aforesaid given polarization. Specifically, the direction of the electric field $E_0$ of the retained circulating wave energy component, which has the given polarization, is $X_1$ and the direction of the quadrature polarization component is $Y_1$.

Third mirror 24, which is substantially totally reflective, is oriented in spaced relationship with partially reflecting and partially transmissive mirror 12 to form a Fabry-Perot cavity therebetween. (Although a Fabry-Perot cavity is an optical-resonant cavity and vice versa, separate terminology is being employed therein for the two respective cavities in order to avoid any confusion or ambiguity in the discussion thereof.) Situated within the Fabry-Perot cavity is electro-optic crystal of a certain length which is composed of a low-loss material which is substantially transparent at the wavelength of wave energy transmitted therethrough. (A particularly good material for a $CO_2$ modulator operating at a wavelength of substantially 10.6 micrometers is good quality cadmium telluride. Such material is easily capable of providing a loss of between 0.5 to 1.0 percent per centimeter. In fact, values as low as 0.1 percent centimeter have been reported for this material.) The output from modulation + bias voltage source 28 is applied as the modulating signal across transverse electrodes 30 and 32 of electro-optic crystal 26.

The most significant structural difference between the Fabry-Perot polarization modulator of the present invention and the somewhat similar laser modulators of the prior art is the angular offset of the crystal axes of electro-optic crystal 26 with respect to the polarization axes of the wave energy incident thereon. Specifically, as shown in the drawing, the crystal axes $X_2$ and $Y_2$ are rotated by 45° with respect to the wave energy polarization axes $X_1$ and $Y_1$. The rotation angle of 45° is preferable so that incident wave energy, having the given polarization in the $X_1$ direction, initially entering electro-optic crystal 26 is resolved into ordinary and extraordinary components therein of substantially equal amplitude. However, a rotation angle of other than 45° which still results in substantial amplitudes for both the ordinary and extraordinary components may still be employed.

In operation, the laser composed of first mirror 10, second mirror 12 and active laser medium 14, in response to the pumping of medium 14 by pump power supply 16, generates polarized circulating wave energy in the optical resonant cavity having an electric field $E_0$ parallel to the $X_1$ axis. Partially reflective and partially transmissive mirror 12 transmits a portion of this circulating wave energy into the Fabry-Perot cavity defined by second mirror 12 and third mirror 24. Electro-optic crystal 26, under the influence of the voltage from source 28, operates as a bipolar birefrigent crystal, with the difference between its index of refraction along its $Y_2$ electro-optic crystal axis and its index of refraction along its $Y_2$ electro-optic crystal axis varying in accordance with the modulation signal component of the voltage applied thereacross, as is known in the art. The incident laser electric field $E_0$, which is launched in electro-optic crystal 26, is reflected back and forth through electro-optic crystal 26 by mirrors 12 and 24 of the Fabry-Perot cavity. However, ultimately wave energy of this field is fed back through partially reflective and partially transmissive mirror 12 into the laser optical resonant cavity defined by mirrors 10 and 12. This total fed-back field, when added vectorially to the field already present in the laser optical cavity, results in the net reflected field $_rE$ rotated with respect to the $Y_1$ axis. The $Y_1$ component of this effective reflected field $_rE_{y_1}$ is ejected from the laser optical resonant cavity by the polarization prism 22. This ejected wave energy comprises the modulated output wave energy of the Fabry-Perot polarization modulator of the present invention. If first mirror 10 is also partially reflecting and partially transmissive, rather than totally reflective, some of the retained laser circulating wave energy itself, having the given polarization along axis $X_1$, will produce a second output (not shown) from mirror 10, as is conventional in lasers.

From the point of view of the present invention, what is important is the action of the Fabry-Perot cavity formed by second mirror 12 and third mirror 24 in augmenting the rotation effect of electro-optic crystal 26 by forcing the circulating wave energy which forms the laser radiation through it many times. If the conditions are chosen properly, in the manner described below, there can be a substantial amplification of the rotation that would have been produced by a single pass of the field through the crystal.

The theory of operation of the present invention is built on the Fabry-Perot theory and the electro-optic effect.

In accordance with the Fabry-Perot theory, the effective field reflectivity of the combination looking from second mirror 12 towards third mirror 24 is given by:

$$r_e = r_2 + r_f \quad (1)$$

where $r_2$ is the field reflectivity of second mirror 12; while $$r_f = \frac{t_2^2 \cdot r_3 \cdot \tau^2 \cdot e^{i\delta}}{1 - r_2 \cdot r_3 \cdot \tau^2 \cdot e^{i\delta}} \quad (2)$$

is the added field reflectivity due to the combined effect of the Fabry-Perot cavity defined by second mirror 12 and third mirror 24. In equation (2), $t_2$ is the field transmissivity of second mirror 12;
$r_3$ is the field reflectivity of third mirror 24;
$\tau$ is the field attenuation factor going through the Fabry-Perot medium, one way, and
$\delta$ is the total phase shift of the field in going through a round trip from second mirror 12 to third mirror 24 and then back to second mirror 12.

It should be noted that $r_f$ is a phasor and, therefore, in equation (1) will add to $r_2$ accordingly.

The effect of blocking the Fabry-Perot cavity by putting an obstruction between second mirror 12 and third mirror 24 is equivalent in equation (2) to making $\tau=0$; while removing third mirror 24 is equivalent to making $r_3 = 0$. In either case, $r_f = 0$ so that the effective reflectivity $r_e$ equals that of second mirror 12 alone as it should. In other words, in these cases, the field in the optical resonant cavity sees only $r_2$.

Considering now the electro-optic effect, if the incident ingoing wave into the Fabry-Perot cavity is resolved along the crystal axes, taking into consideration that the sine and cosine of 45° are both equal to $\sqrt{1/2}$, it will be seen that the two resolved components $_iE_{x_2}$ and $_iE_{y_2}$ are given as follows:

$$_iE_{x_2} = \frac{E_0}{\sqrt{2}} \quad (3)$$

$$_iE_{y_2} = \frac{E_0}{\sqrt{2}} \quad (4)$$

Since a field going through a crystal along an electro-optic axis is not rotated, each of these two fields will reflect back and forth independently between the second mirror 12 and the third mirror 24 defining the Fabry-Perot cavity. However, due to the different indices of refraction of the crystal with respect to these two fields, the optical length of the Fabry-Perot cavity for each of these two fields will be different, and the amount of this difference will be a function of the instantaneous amplitude of the modulating signal then being applied.

One can then apply equation (2) for each of these two crystals axes and thus obtain:

$$r_{f_{x_2}} = \frac{t_2^2 \cdot r_3 \cdot \tau^2 \cdot e^{\delta x_2}}{1 - r_2 \cdot r_3 \cdot \tau^2 e^{\delta x_2}} \quad (5)$$

and $$r_{f_{y_2}} = \frac{t_2^2 \cdot r_3 \cdot \tau^2 \cdot e^{\delta y_2}}{1 - r_2 \cdot r_3 \cdot \tau^2 \cdot e^{\delta y_2}} \quad (6)$$

where $r_{f_{x_2}}$ is defined from $$\frac{_rE_{x_2}}{_iE_{x_2}} = r_{e_{x_2}} = -r_{2x_2} + r_{f_{x_2}} \quad (7)$$

and $r_{f_{y_2}}$ from $$\frac{_rE_{y_2}}{_iE_{y_2}} = r_{e_{y_2}} = -r_{2y_2} + r_{f_{y_2}} \quad (8)$$

Here again $_iE_{x_2}$ defines the incident field in the direction $X_2$ going into the Fabry-Perot cavity defined by second mirror 12 and third mirror 24, while $_rE_{x_2}$ defines the net field returning from the Fabry-Perot cavity to the optical-resonant cavity after all the phasors have been added in this direction. A similar definition applied for the $Y_2$ direction.

It is seen that equations (5) and (6) are identical except for the phase term $\delta$, which contains the electro-optic effect.

The effective reflectivity with respect to the $X_1$ and $Y_1$ axes are defined as follows:

$$r_{e_{x_1}} = \frac{_rE_{x_1}}{E_0} \quad (9)$$

and $$r_{e_{y_1}} = \frac{_rE_{y_1}}{E_0} . \quad (10)$$

From conservation of energy considerations, it can be shown that $$r_{e_{x_1}} = \frac{1}{2}(r_{e_{y_2}} + r_{e_{x_2}}) \quad (11)$$

and $$r_{e_{y_1}} = \frac{1}{2}(r_{e_{y_2}} - r_{e_{x_2}}) . \quad (12)$$

The reflected intensity $_rI_{y_1}$ along the $Y_1$ direction can be calculated from equations (7), (8), (10) and (12), as $$_rI_{y_1} = I_0 |r_{e_{y_1}}|^2 = \frac{I_0}{4} |r_{f_{y_2}} - r_{f_{x_2}}|^2 \quad (13)$$

where intensities I are proportional to $|E|^2$.

Similarly, the reflected intensity along the original $X_1$ direction is given by $$_rI_{x_1} = I_0 |r_{e_{x_1}}|^2 = I_0 |-r_2 + 1/2(r_{f_{x_2}} + r_{f_{y_2}})|^2 \quad (14)$$

It can be noted that if the medium in this Fabry-Perot cavity were not birefrigent,
$r_{f_{y_2}} = r_{f_{x_1}} = r_f$.
In this special case, $$_rI_{y_1} = 0 \text{ while } _rI_{x_1} = I_0 |-r_2 + r_f|^2,$$

as it should.

The coupling ratio for the Fabry-Perot polarization modulation shown in the drawing can be written as $$C_{FPPM} = \frac{_rI_{y_1}}{I_0} = 1/4 |r_{f_{y_2}} - r_{f_{x_2}}|^2 \quad (15)$$

For comparison purpose, the coupling ratio of the standard form of laser internal polarization modulator (i.e. a double pass system) working under the same conditions is $$C_{IMP} = \sin^2 \theta \quad (16)$$

Where $\theta$ is the phase difference, per pass, through the modulator.

Using expressions (15) and (16), it is now possible to make a direct comparison between the two systems. This shall be done by defining an improvement ratio K of the Fabry-Perot polarization modulation (FPPM) technique over the conventional internal polarization modulation (IPM), such that $$K = \frac{C_{FPPM}}{C_{IPM}} \quad (17)$$

It is seen from the foregoing that in order to calculate $C_{FPPM}$, the phasors $r_{f_{x_2}}$ and $r_{f_{y_2}}$ have to be evaluated.

Since $C_{FPPM}$ is proportional to the difference between these two phasors, it might appear at first that the modulator should be biased for maximum variation in $r_f$ with voltage. Unfortunately this maximum usually occurs in a bad region as far as the main laser is concerned. A compromise has to be found between good modulator sensitivity and the smallest possible perturbation on the main laser cavity. This is necessary if fast response is required.

To optimize the system, it is then necessary to impose a few pre-requisite constraints in the selection of the various cavity parameters and the operating conditions:

a. The optimum reflectivity ($R_2$) of partially reflective and partially transmissive second mirror 12 is a function of the gain of the laser tube and the loss parameters. It is a good rule, however, to assume that
$$R_2 \geq 80\%$$
where $R_2 = r_2^2$ is the power reflectivity of second mirror 12.

b. FIG. 2 shows a typical effective reflectivity curve $R_e$, as a function of phase shift $\delta$. Since a minimum perturbation of the main laser cavity is wanted when the modulator is turned on, the operating point should be around $R_e \approx R_2$, at $\delta = \delta_0$.

c. For the same reason as (b), the variation in $R_e$ for modulator on or off should be
$$\Delta R_e \leq 5\%$$

d. To tap off, around 1% of the power inside the laser cavity when the modulator is turned on, it can be shown that $$.15 \leq |r_{f_{y_2}} - r_{f_{x_2}}| \leq .3$$

e. The phase change in $R_e$ for switching the modulator all the way from on to off should produce a resonance frequency change of the main cavity which is small compared to the bandwidth of the laser line used (typically 70 MHz in a $CO_2$ laser). In order to satisfy the five criteria (a) ... (e) above, it is necessary to select the mirror parameters as follows:
$$R_2 \approx 90\%$$
$$R_3 \approx 100\%.$$

Further, losses at the mirrors and through the crystal have a strong negative effect on the operations of the Fabry-Perot polarization modulator. Therefore, high quality mirrors with losses of the order of 0.5% to 1% should be employed.

Taking into consideration the constraints imposed by the five criteria (a) ... (e), one can employ the foregoing equations to calculate the improvement ratio K for a given set of crystal loss, mirror losses and mirror reflectivity of the Fabry-Perot cavity. Calculations for ten specific cases are shown in the following table:

TABLE

| CASE | $R_2$ | $R_3$ | Mirror Losses | Crystal Loss | $\delta_{v_2}$ | $\delta_{x_2}$ | $\Delta\epsilon$ | $R_{e_{x_1}}$ | $C_{FPPM}$ | $C_{IPM}$ | K= $\frac{C_{FPPM}}{C_{IPM}}$ |
|---|---|---|---|---|---|---|---|---|---|---|---|
| 1. | 90% | 100% | 0 | 0 | 0° | 1° | 1° | 100% | 9.9% | .0075% | 1319 |
| 2. | 90% | 100% | 0 | .2% | 2° | 3° | 1° | 90% | 3.5% | .0075% | 471 |
| 3. | 90% | 100% | 0 | .5% | 4° | 5° | 1° | 87% | .95% | .0075% | 127. |
| 4. | 90% | 99.5% | .5% | .5% | 5° | 7° | 2° | 83% | 1.46% | .031% | 47.7 |
| 5. | 88% | 99.5% | 5% | .5% | 6° | 10° | 3° | 90% | 1.45% | .069% | 21 |
| 6. | 90% | 99.5% | .5% | .5% | 7° | 9° | 2° | 90% | .59% | .031% | 19.2 |

TABLE-continued

| CASE | $R_2$ | $R_3$ | Mirror Losses | Crystal Loss | $\delta_{v_2}$ | $\delta_{x_2}$ | $\Delta\epsilon$ | $R_{r_{x_1}}$ | $C_{FPPM}$ | $C_{IPM}$ | $K = \dfrac{C_{FPPM}}{C_{IPM}}$ |
|---|---|---|---|---|---|---|---|---|---|---|---|
| 7. | 92% | 99.5% | .5% | .5% | 6° | 9° | 3° | 90% | 1.16% | .069% | 16.9 |
| 8. | 88% | 99% | 1% | .5% | 9° | 12° | 3° | 85% | .63% | .069% | 9.21 |
| 9. | 92% | 99.5% | 1% | .5% | 7° | 10° | 3° | 90% | .62% | .069% | 9.1 |
| 10. | 90% | 99% | 1% | .5% | 9° | 14° | 5° | 92% | .41% | .19% | 2.16 |

Case 1, in the above table, is an ideal case, since it is assumed that there is not loss in either the mirrors or the crystal. In this ideal case 1, the improvement ratio K has the huge value of 1,319. Furthermore, in this ideal case 1, the effective reflectivity $R_{ex_1}$ is 100%, since there is no loss in the system. Although this ideal case number 1 cannot be physically realized, its calculation is valuable for comparison purposes.

As the losses in the mirrors and/or the crystal increase, the improvement ratio K quickly decreases, as can be seen from the above table, but still can be made quite high. For instance, in case 4, with a 90% reflectivity for the second mirror, a 99.5% reflectivity for the third mirror, mirror losses of 0.5% and a crystal loss of 0.5%, all of which can be realized in practice, the improvement ratio K still has a value of nearly 50. Cases 5 . . . 10, with different optical bias conditions, losses and reflectivity are calculated for decreasing values of the improvement ratio K. However, all of these have an improvement factor K larger than 1. Hence, they are all improvements over the prior art internal polarization modulation techniques.

It can be shown that the substantial improvement in efficiency with the Fabry-Perot polarization modulation technique of the present invention (as indicated by the relatively large values of the improvement ratio K that can be realized) is not obtained at the expense of necessary bandwidth capability. For instance, an improvement ratio K of approximately 50 can be obtained with reflectivity and loss parameters which provide a bandwidth in the order of 2GHz.

What is claimed is:

1. Apparatus for generating a polarization modulated laser beam of coherent wave energy; said apparatus comprising:
   a. first and second spaced mirrors, at least said second mirror being partially reflecting and partially transmissive, said first and second mirrors being positioned with respect to each other to define therebetween an optical resonant cavity at the wavelength of said coherent wave energy;
   b. means including an active laser medium situated within said optical resonant cavity for generating said coherent wave energy in response to a pump source being coupled to said active lasing medium;
   c. polarizer means situated within said optical resonant cavity for retaining within said optical resonant cavity only that component of said coherent wave energy incident thereon which has a given polarization and for ejecting from said optical resonant cavity that component of said coherent wave energy incident thereon which as a polarization in quadrature with said given polarization;
   d. a third mirror situated outside of said optical resonant cavity in spaced relationship with said second mirror to define therebetween a Fabry-Perot cavity at the wavelength of said coherent wave energy, with said optical resonant cavity and said Fabry-Perot cavity being optically aligned to permit coherent wave energy partially transmitted by said second mirror to move in either direction between said cavities, and
   e. polarization-rotating means situated in said Fabry-Perot cavity for rotating the polarization of coherent wave energy incident thereon in accordance with a modulating signal applied to said polarization-rotating means.

2. The apparatus defined in claim 1, wherein said active lasing medium is $CO_2$ and said coherent wave energy has a wavelength of substantially 10.6 micrometers.

3. The apparatus defined in claim 1, wherein said polarization-rotating means comprises an electro-optic crystal having its crystal axes angularly offset by a predetermined amount with respect to the direction of said given polarization about the length of said Fabry-Perot cavity.

4. The apparatus defined in claim 3, wherein said predetermined amount is substantially 45°.

5. The apparatus defined in claim 3, wherein said polarization-rotating means further comprises spaced electrodes for applying a modulating electric field through said crystal in a direction transverse to the length of said Fabry-Perot cavity.

6. The apparatus defined in claim 4, further comprising a source of voltage which includes at least a modulation component coupled to said electrodes.

7. The apparatus defined in claim 6, wherein said source of voltage further includes a bias component.

8. The apparatus defined in claim 1, wherein said polarizer means includes a polarization prism.

9. The apparatus defined in claim 1, wherein said polarizing means includes at least one Brewster window.

10. The apparatus defined in claim 1, wherein said first mirror is substantially totally reflective.

11. The apparatus defined in claim 1, wherein said first mirror is partially reflective and partially transmissive.

* * * * *